United States Patent [19]

Steck et al.

[11] Patent Number: 4,755,395
[45] Date of Patent: Jul. 5, 1988

[54] PREPARATION OF ACICULAR COBALT-CONTAINING FERRIMAGNETIC IRON OXIDES

[75] Inventors: Werner Steck, Ludwigshafen; Rainer Feser, Hessheim; Werner Loeser, Ludwigshafen; Peter Rudolf, Maxdorf; Guenter Vaeth, Limburgerhof; Helmut Jakusch, Frankenthal; Jenoe Kovacs, Hessheim, all of Fed. Rep. of Germany

[73] Assignee: BASF Aktiengesellschaft, Fed. Rep. of Germany

[21] Appl. No.: 859,902

[22] Filed: May 5, 1986

[30] Foreign Application Priority Data

May 10, 1985 [DE] Fed. Rep. of Germany ....... 3516885

[51] Int. Cl.$^4$ .............................................. C01G 49/06
[52] U.S. Cl. ................................... 427/127; 252/62.56
[58] Field of Search ..................... 252/62.56; 427/127

[56] References Cited

U.S. PATENT DOCUMENTS

| 2,694,656 | 11/1954 | Camras et al. | 428/329 |
| 3,015,627 | 1/1962 | Ayers et al. | 252/62.54 |
| 3,015,628 | 1/1962 | Ayers et al. | 252/62.54 |
| 3,082,067 | 3/1963 | Hund et al. | 252/62.57 |
| 3,382,174 | 5/1968 | Hund | 252/62.57 |
| 4,296,149 | 10/1981 | Rudolf et al. | 252/62.56 X |
| 4,464,352 | 8/1984 | Autzen et al. | 252/62.56 X |
| 4,486,467 | 12/1984 | Nakata et al. | 252/62.56 X |
| 4,497,723 | 2/1985 | Ohlinger et al. | 252/62.56 |

FOREIGN PATENT DOCUMENTS 1392196 5/1975 United Kingdom .

Primary Examiner—Jack Cooper
Attorney, Agent, or Firm—Keil & Weinkauf

[57] ABSTRACT

The preparation of acicular ferrimagnetic iron oxides which contain cobalt and phosphate ions and, if desired, further additives, and their use for manufacturing magnetic recording media.

3 Claims, 1 Drawing Sheet

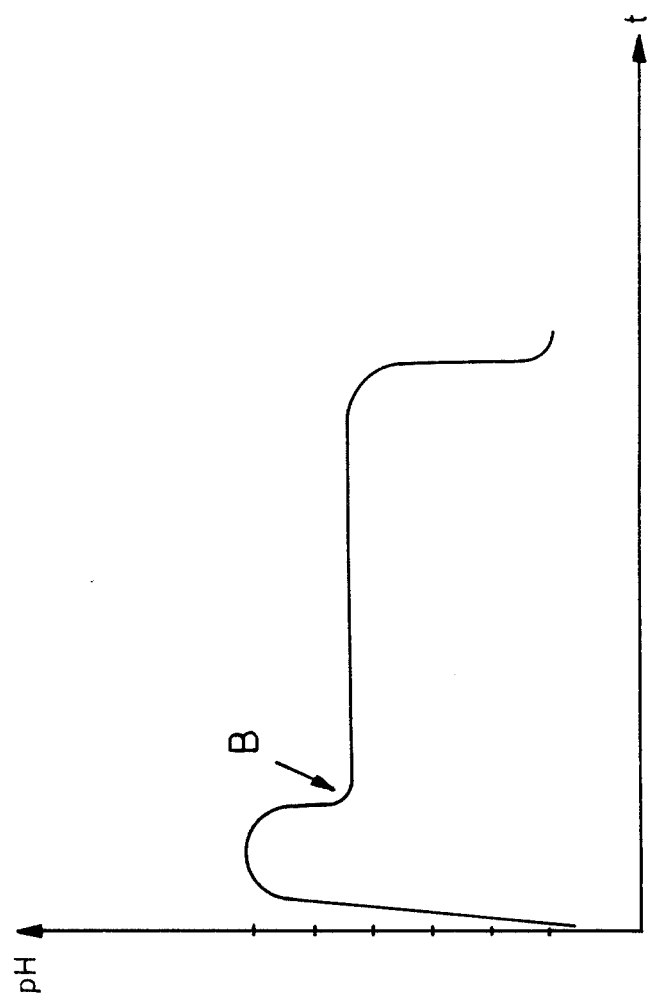

PREPARATION OF ACICULAR COBALT-CONTAINING FERRIMAGNETIC IRON OXIDES

The present invention relates to a process for preparing acicular ferrimagnetic iron oxides which contain cobalt and phosphate ions and, if desired, further additives, and to their use for manufacturing magnetic recording media.

Acicular $\gamma$-iron(III) oxide or cobalt-containing $\gamma$-iron(III) oxide is used on a large scale as magnetic material for the manufacture of magnetic recording media. The former oxide is obtained from iron oxide hydroxide by dehydration, reduction to magnetite and subsequent oxidation; the latter is obtained by the same procedural steps followed by the application of a cobalt-containing coating and an optional heat treatment.

The iron oxide hydroxide starting material used has a significant bearing on the properties of the magnetic pigment in the recording medium. For instance, the average particle size and shape and the particle size distribution in the FeOOH pigment have a strong influence on the magnetic properties, such as the orientation ratio, coercive force and switching field distribution. Undersize material in the iron oxide hydroxide can result in unfavorable signal to print-through ratios.

In the literature acicular iron oxide hydroxide is prepared by the acid process. In this two-stage process, an Fe(II) salt solution is first of all treated to precipitate some of the Fe(II) in the form of Fe(OH)$_2$, which is oxidized with air to FeOOH nuclei. In a second step, the FeOOH nuclei grow into the end product as a result of further oxidation of the Fe(II) ions at below pH 7. This process is described, inter alia, in U.S. Pat. No. 2,694,656 and German Published Application No. DAS 1,061,760, in connection with the preparation of the $\alpha$- and $\gamma$-modifications, respectively, for magnetic recording media. A number of publications have also disclosed variants in which the iron oxide hydroxide pigment is doped with foreign ions. Apart from transition metal cations, for example Zn (German Published Application No. DAS 1,300,861), anions and especially those which contain elements of main group V can affect the course of the synthesis reaction and the product properties. German Published Application No. DAS 1,176,111 proposes introducing PO$_4^{3-}$ ions in the nucleation phase before the start of the Fe(II) oxidation, giving $\alpha$-FeOOH in the form of short needles. The addition of phosphate ions in the $\gamma$-FeOOH synthesis described in German Published Application No. DAS 1,219,009 results in the formation of substantially isometric particles which are therefore unsuitable for the preparation of high-grade magnetic materials. In German Published Application No. DAS 1,225,157 this process is combined with the addition of phosphate ions after the nucleation or during the growth step, while according to German Published Application No. DAS 1,223,352 the needle shape can be affected by additions of arsenate or arsenate/phosphate.

A number of proposals have also been made in connection with the further process steps of preparing $\gamma$-iron(III) oxide and modifying it with cobalt. The many and varied attempts to prepare acicular cobalt-containing iron oxides show that the demands on the product used as magnetic material for magnetic recording layers are very high. For instance, it is essential that the magnetic material be very finely divided in order to obtain a magnetic layer with a smooth surface, which is important in the case of media for recording video signals, and to achieve a favorable signal-to-noise ratio. However, the signal-to-noise ratio can only be determined after incorporation of the magnetic material into the magnetic layer.

It is an object of the present invention to provide a process for preparing acicular cobalt-containing ferrimagnetic iron oxides which can be carried out in a simple manner and yields oxides which, on the one hand, have the requisite magnetic recording properties, such as a high coercive force, and, on the other, after incorporation into the magnetic layer, give video recording media exhibiting luminance signal-to-noise ratios which are higher than those of the prior art media, audio tapes with a favorable background noise to print-through ratio, and data recording media exhibiting high bit densities.

We have found that this object is achieved, surprisingly, by a process for preparing acicular cobalt-containing ferrimagnetic iron oxides possessing the required properties, which is based on the acid process and comprises producing, in a first stage, $\gamma$-FeOOH nuclei in the presence of from 0.2 to 1.0% by weight, based on the amount of $\gamma$-FeOOH end product, of phosphate ions by adding alkalis to iron(II) salt solutions and simultaneously carrying out oxidation by passing in air, and then, in a second stage, permitting these nuclei to grow at pH 4–5.5 into the $\gamma$-FeOOH end product which, after filtration and washing, is dehydrated at 300°–600° C. and then reduced to magnetite by means of organic substances which are decomposable in the presence of iron oxide, the magnetite being subsequently oxidized with oxygen-containing gases to gamma-iron(III) oxide which is the modified by precipitating iron(II) and/or cobalt hydroxide at 20°–100° C. in alkaline suspension, after which filtering and heating at 100°–350° C. under inert gas are carried out.

BRIEF DESCRIPTION OF THE DRAWING

The drawing FIGURE illustrates the control of pH over time in the preparation of $\gamma$-FeOOH nuclei by the addition of alkalis to an acidic iron(II) salt solution in the presence of phosphate ions.

In the process of the invention, the $\gamma$-FeOOH (lepidocrocite) is prepared from iron(II) salt solutions with alkalis and simultaneous oxidation by the acid synthesis method. It has been found to be particularly advantageous to start from an aqueous iron(II) chloride solution and then add an alkali, such as an alkali metal hydroxide or ammonia, while heating at temperatures of from 10° to 36° C., introducing air and effecting vigorous stirring (for producing fine air bubbles), to form iron(III) oxide hydrate nuclei in an amount of from 25 to 60 mol % of the starting iron. The addition of the phosphate ions in the form of orthophosphoric acid and/or its primary and/or secondary and/or tertiary alkali metal and ammonium salts is advantageously carried out before the Fe(OH)$_2$ precipitation, but must be carried out at the latest by the time, measured from the beginning of the oxidation, it takes the pH to reach the salient point B in the curve, as shown in the pH/time diagram (FIG.). The phosphate ions are added in amounts of from 0.2 to 1.0% by weight, preferably from 0.3 to 0.6% by weight, based on $\gamma$-FeOOH end product. The nuclei then grow into the end product at 20°–70° C. and a pH of 4.0–5.5, which is kept in this range by the addition of further amounts of alkali, while ensuring that air is finely dispersed throughout the suspension. On completion of nuclei growth, the iron(III) oxide hydroxide solids content in the aqueous suspension is 10–70 g/l, preferably 15–65 g/l. After removal by filtration and washing, the iron(III) oxide hydroxide is dried at 60°–200° C. In this way it is possible to obtain mechanically stable crystal needles of lepidocrocite, which are virtually free of dendritic branching.

Thereafter the $\gamma$-FeOOH is converted into $\gamma$-Fe$_2$O$_3$ in a conventional manner, the iron oxide hydroxide being either dehydrated in a separate step at 300°–600° C. to $\gamma$-Fe$_2$O$_3$ and the $\gamma$-Fe$_2$O$_3$ reduced in a reducing atmosphere at 350°–500° C. to magnetite (for example as described in German Laid-Open Application No. DOS 2,735,316), or dehydrated at 350°–500° C. and reduced to magnetite in a single step (for example as described in German Pat. No. 2,212,435 and German Laid-Open Application No. DOS 3,143,870). The reducing agents, which may be used with or without hydrogen and/or carbon monoxide, are organic compounds which decompose in the presence of iron oxides. It has proved advantageous to add the organic substance at as early a stage as the fresh synthesis suspension of the $\gamma$-FeOOH or at the stage of the unwashed or washed filter cake or to the dried product. For the purposes of the present invention, it has proved particularly advantageous to carry out the reduction by means of organic substances in the presence of tin compounds, as described in German Laid-Open Application No. DOS 3,204,547 which corresponds to U.S. Pat. No. 4,457,982. It can also be advantageous to stabilize the shape of the $\gamma$-FeOOH particles in a conventional manner by applying inorganic and/or organic compounds. The magnetite intermediate can be oxidized in a conventional manner with oxidizing gases, e.g. oxygen or air, at temperatures of from about 250° to 500° C. Depending on the specific oxidation temperature, oxidation times of from 10 minutes to 2 hours have proved advantageous, it being necessary to select the oxidation conditions so as to avoid the known irreversible conversion of $\gamma$-Fe$_2$O$_3$ into $\alpha$-Fe$_2$O$_3$.

The $\gamma$-Fe$_2$O$_3$ is doped with cobalt by precipitating CO(OH)$_2$ and Fe(OH)$_2$ onto it, for example as described in German Laid-Open Application No. DOS 2,705,967, EP-A-14,902 or EP-A-14,903, the $\gamma$-Fe$_2$O$_3$ being suspended in water by vigorous stirring, and precipitated by the addition of Co(II) and Fe(II) salts and of NaOH, Co(OH)$_2$ and Fe(OH)$_2$. The suspension is brought to not less than pH 10, preferably not less than pH 12. The order in which the Co(II) salt, Fe(II) salt and NaOH are added can be varied in the process according to the invention. Preferably the $\gamma$-Fe$_2$O$_3$ is initially charged together with the Co(II) salt, and then the NaOH is added, followed, after stirring for 1 hour, by the Fe(II) salt. It is advisable, after precipitation of the hydroxides, to effect vigorous stirring for a prolonged period. A period of from 4 to 7 hours has proved advantageous and sufficient. The entire reaction is carried out under a blanket of inert gas. The reaction temperature is 20°–100° C., preferably 40°–70° C. Suitable Co(II) and Fe(II) salts are in particular the chlorides and sulfates. If the $\gamma$-Fe$_2$O$_3$ is doped with Co(OH)$_2$ alone, the reaction temperature is preferably 50°–100° C. On completion of the hydroxide precipitation, the whole solids content is filtered off and washed with water until the wash liquor gives a neutral reaction. The filter cake is then dried in vacuo at 70°–100° C. To increase the coercive force, the pigment is preferably heated at 100°–300° C. under inert gas. This heat treatment gives particularly good results if carried out in the presence of an organic compound which is decomposable in the presence of iron oxides. This organic compound is added either to the $\gamma$-Fe$_2$O$_3$ before the precipitation of the Me(II) hydroxides or, after drying, to the cobalt-containing $\gamma$-Fe$_2$O$_3$, in the latter case preferably by saturating the inert gas atmosphere with the vapor of low-boiling organic compounds. The amounts of Co(II) and Fe(II) to be used and the heat treatment conditions which determine the coercive force depend on the intended use of the medium.

The cobalt-containing iron oxides prepared according to the invention are highly suitable for use as magnetic material for magnetic recording media, such as audio tapes, data recording media and, in particular, video tapes. They are highly dispersible in particularly short times and give outstandingly homogeneous dispersions and magnetic recording media. Compared with the prior art acicular iron oxides prepared on the basis of PO$_4$$^{3-}$-containing goethite or undoped lepidocrocite, the iron oxides of the invention give, inter alia, significantly better video signal-to-noise ratios.

The magnetic recording media are manufactured in a conventional manner. To this end, the iron oxide pigment is dispersed together with the customary additives, such as dispersants, e.g. sodium oleate, zinc oleate, sodium laurate, sodium palmitate or sodium stearate, with or without non-magnetic fillers, such as quartz powder, powders based on silicate, aluminum oxide, zirconium oxide, and binders dissolved in organic solvents, such as elastomeric polyurethanes, epoxy resin, vinyl chloride/vinyl acetate copolymers, OH-containing polyurethanes crosslinked with polyfunctional isocyanates, and mixtures thereof, in a dispersing unit, such as a tubular or stirred ball mill. The magnetic dispersion is then applied by means of a conventional coating machine to the non-magnetic base. Suitable non-magnetic bases are the usual base materials, in particular films made of linear polyesters, such as polyethylene terephthalate, and ranging in thickness from 4 to 20 $\mu$m. Before the still fluid coating mixture is dried on the base, the anisotropic magnetic particles are oriented in the intended recording direction by the action of a magnetic field. The magnetic layers are then calendered by passing the coated base between heated, polished rolls. The thickness of the magnetic layer is in general from 2 to 6 $\mu$m.

The process according to the invention is further illustrated by the following Examples; the comparative experiments represent the state of the art. The magnetic properties of the powder samples were measured with a vibrating sample magnetometer in a magnetic field of 160 kA/m or, after magnetization to saturation in a discharge capacitor, in a vibrating sample magnetometer. In the case of the powder measurements, the coercive force H$_c$, measured in [kA/m], is based on a tamped density of $\rho=1.2$ g/cm$^3$. The specific remanence (M$_r$/$\rho$) and specific saturation magnetization (M$_m$/$\rho$) are both given in [nTm$^3$].

The specific surface area S$_{N2}$ of the pigments is determined in m$^2$/g by the BET method: nitrogen is absorbed onto weighed evacuated, gas-free pigment samples. The difference in the amount of nitrogen before and after adsorption is converted into occupied area and set in relation to the sample weight.

The luminance signal-to-noise ratio, i.e. the ratio of a 100% luminance signal to the noise level, was measured with a UPSF noise level meter from Rohde und Schwarz (>100 kHz).

EXAMPLE I.1

A 1000 liter metal vessel, equipped with a stirrer, temperature and pH control means, and air and nitrogen feed lines, was charged with 441 l of water and 129.6 l of a technical 30.3% by weight strength $FeCl_2$ solution, while stirring and introducing nitrogen, and 127.6 ml of 85% strength $H_3PO_4$, corresponding to 0.5% by weight, based on the theoretical yield of $\gamma$-FeOOH, which had been dissolved beforehand in 1 l of water, were added. The solution pH was then 2.1, and the temperature was adjusted to 20° C. A pump was then used to introduce in the course of 3 minutes 95 l of 15.2% strength technical sodium hydroxide solution, corresponding to a degree of precipitation of 50% of Fe(II), and thereafter the aqueous $Fe(OH)_2$ suspension was cooled down again to 20° C. for 10 minutes, while stirring and continuing to supply nitrogen. The $N_2$ gas stream was then replaced by an air stream, with continued stirring and maintenance of 20° C. Nucleation was complete after 80 minutes. The orange suspension of nuclei had a pH of 3.5. While maintaining the other conditions, the temperature was then raised from 20° to 32° C., and the growth process was carried out at pH 5.2-5.4 in the course of 465 minutes, the pH being kept in this range by the automatic pH control means which metered in aqueous 15% strength sodium hydroxide solution as required. The cooled $\gamma$-FeOOH suspension at 20° C. was then filtered on a filter press and washed with water until the filtrate was chloride-free. The filter cake was dried at 130° C. in a through-circulation oven. The BET surface area is given in Table 1.

EXAMPLE I.2

In a 5-liter glass vessel equipped with a reflux condenser, temperature and pH control means and stirrer, 2326 ml of water were added to 279 g of technical $FeCl_2$, corresponding to 674 ml of a 30.7% by weight strength solution. 500 ml of 15.1% strength sodium hydroxide solution were added while 200 l (S.T.P) of nitrogen were passed in per hour, and the resulting $Fe(OH)_2$ suspension was stirred for a further 10 minutes. The nitrogen was then replaced at 20° C. by air in order to start $\gamma$-FeOOH nucleation. 75 minutes later, and at a suspension pH of 6.0, 0.67 ml of 85% strength $H_3PO_4$ was added. After a further 100 minutes, i.e. after an overall time of 175 minutes, the pH had dropped to a value below 4, and $\gamma$-FeOOH nucleation was complete. The temperature was then raised to 40° C. and, with continued stirring and the introduction of air, the growth process was carried out in the course of 305 minutes at pH 5.2, the pH being kept at this value by the pH control means which metered in 15% strength sodium hydroxide solution as required. The $\gamma$-FeOOH was then filtered off, washed with water until the filtrate was chloride-free, and dried at 80° C. in a vacuum drying cabinet. The BET surface area is given in Table 1.

EXAMPLE I.3

A vessel having a capacity of 51 m³ and equipped with a stirrer, temperature and pH control means and an air feed line was charged with 24 m³ of water, 6.95 m³ of 30.5% strength iron(II) chloride solution and 12.1 kg of 62% strength phosphoric acid. 5.4 m³ of NaOH were then added at 20°-22° C. in the course of 30 minutes, with stirring, followed by the introduction of 3000 m³ (S.T.P) of air per hour. Nucleation was complete after 300 minutes. The orange suspension had a pH of 2.8. After raising the temperature to 35° C. and introducing further air, 5.4 m³ of 14.9% strength NaOH were added in the course of 270 minutes, the NaOH being so metered in by the pH control means that a pH of 5.3 was maintained. At the end of the growth period, 11.4 kg of $SnCl_2 \cdot H_2O$, dissolved in water, were added and the reaction mixture was brought to pH 8.0. The suspension was then circulated by pumping for 2 hours, with stirring.

Half of the $\gamma$-FeOOH suspension was filtered on a filter press, and the solid was washed with water until neutral (pH 7). Drying was carried out at 160° C. in air (part I.3A).

The other half of the suspension had added to it 30 l of olive oil, was heated to 50° C. and was stirred for a further 2 hours. Working up was carried out as described for part I.3A (part I.3 B).

The BET surface area is given in Table 1.

EXAMPLE I.4

Example I.3 A was repeated, except that only 7.3 kg of 62% strength phosphoric acid were added.

The BET surface area is given in Table 1.

COMPARATIVE EXAMPLE I.5

Example I.3 A was repeated, except that no phosphoric acid was added. The BET surface area is given in Table 1.

COMPARATIVE EXAMPLE I.6

A 250 liter metal vessel, equipped with a stirrer, temperature and pH control means, and air and nitrogen feed lines, was charged with 18.5 l of 31% strength $FeCl_2$ solution and 64.5 l of water, while stirring and introducing nitrogen. 23 l of 10% strength NaOH were added at 20° C. in the course of 10 minutes. The $N_2$ gas stream was then replaced by an air stream while the other conditions were maintained. 40 minutes later nucleation was complete. The temperature was then raised to 40° C. and 48 l of 5% strength NaOH were added in the course of 50 minutes, the NaOH being so metered in by the pH control means that a pH of 5.5 was maintained. The orange suspension was filtered on a suction filter, and the filter cake was washed with water until the filtrate was chloride-free. Drying was carried out at 100° C in a vacuum drying cabinet. The BET surface area is given in Table 1.

EXAMPLE I.7

A 10 liter glass vessel, equipped with a reflux condenser, temperature and pH control means and a stirrer, was charged with 558 g of technical $FeCl_2$, corresponding to 1395 ml of a 29.9% by weight strength solution, and 1.34 ml of 85% strength phosphoric acid, corresponding to 0.5% by weight, based on the theoretic yield of $\gamma$-FeOOH. Water was then added to bring the solution to a total volume of 6 l. 1000 ml of 1.5% strength sodium hydroxide solution were then added in the course of 5 minutes, while supplying nitrogen, and the resulting $Fe(OH)_2$ suspension was stirred for a further 10 minutes. The nitrogen was then replaced at 20° C. by air until after 70 minutes the suspension pH had dropped to 4. The temperature was then raised to 40° C. and the growth process was carried out at pH 5.1 in the course of 330 minutes, with continued stirring and the introduction of air, the pH being kept at this value by the pH control means which metered in 15% strength sodium hydroxide solution as required. The suspension was then brought to pH 4.5 by adding oxalic acid ($H_2C_2O_4.2H_2O$), and stirred for a further 10 minutes, after which 0.8% by weight of $PO_4^{3-}$, based on $\gamma$-FeOOH, was added in the form of 85% strength $H_3PO_4$. Stirring was carried out for a further 10 minutes, and the $\gamma$-FeOOH was then worked up as described in Example I.2. The BET surface area is given in Table 1.

COMPARATIVE EXAMPLE I.8

A 250 liter metal vessel, equipped with a stirrer, temperature and pH control means, and air and nitrogen feed lines, was charged with 25.7 kg of $Fe(II)SO_4.7H_2O$, 126 l of water, 70 l of $H_2SO_4$ (98% strength) and 115.6 g of $Na_2PO_4.2H_2O$, while stirring and introducing nitrogen. After heating to 50° C. 31 l of 15% strength NaOH were added in the course of 15 minutes. Air was then passed in at 50° C. 135 minutes later nucleation was complete. 15 l of 15% strength NaOH were then added in the course of 100 minutes while maintaining the other conditions, the NaOH being so metered in by the pH control means that a pH of 5.5 was maintained. The yellow suspension was then filtered on a suction filter, and the filter cake was washed with water until the filtrate was $SO_4^{2-}$-free. Drying was carried out at 100° C. in a vacuum drying cabinet. The BET surface area of the resulting $\alpha$-FeOOH is given in Table 1.

COMPARATIVE EXAMPLE I.9

Example I.8 was repeated, except for the following differences:

36.0 kg of $FeSO_4.7H_2O$, 96 ml of $H_2SO_4$ (98% strength) and 161.8 g of $NaH_2PO_4.2H_2O$ were added in 130 l of water. $Fe(OH)_2$ was precipitated before the start of the nucleation period by means of 9.5 l of 50% strength NaOH. In the course of the growth phase 19 l of 15% strength NaOH were metered in. The BET surface area of the resulting $\alpha$-FeOOH is given in Table 1.

TABLE 1

| | FeOOH | | |
|---|---|---|---|
| Example | Modification | $S_{N2}$ [m²/g] | Doping |
| I.1 | $\gamma$ | 38.5 | 0.5% $PO_4^{3-}$ |
| I.2 | $\gamma$ | 28.7 | 0.42% $PO_4^{3-}$ |
| I.3 | $\gamma$ | 36.9 | 0.5% $PO_4^{3-}$, 0.3% $Sn^{2+}$ |
| I.4 | $\gamma$ | 32.1 | 0.3% $PO_4^{3-}$, 0.3% $Sn^{2+}$ |
| I.5 (v) | $\gamma$ | 30.1 | 0.3% $Sn^{2+}$ |
| I.6 (v) | $\gamma$ | 35.5 | none |
| I.7 | $\gamma$ | | 0.5% $PO_4^{3-}$ |
| I.8 (v) | $\alpha$ | 51.2 | 0.75% $PO_4^{3-}$ |
| I.9 (v) | $\alpha$ | 39.8 | 0.8% $PO_4^{3-}$ |

EXAMPLE II.1

The $\gamma$-FeOOH prepared in Example I.1 was dehydrated and heated at 420° C. in a nitrogen stream in a continuous tubular furnace in the course of 30 minutes to give $Fe_2O_3$.

The $Fe_2O_3$, was then mixed with 2.5% by weight, based on $Fe_2O_3$, of stearic acid and reduced at 380° C. in a gas stream consisting of equal parts of hydrogen and nitrogen in a furnace of the same type in the course of 30 minutes to $Fe_3O_4$. Before entry into the reduction tube the $H_2/N_2$ gas mixture was passed through water at 60° C. On completion of reduction, the magnetite sample was oxidized at 280° C. in an air stream in a furnace of the same type in the course of 30 minutes to give $\gamma$-$Fe_2O_3$. The results are shown in Table 2.

EXAMPLE II.2

Further parts of the $\gamma$-FeOOH prepared in Example I.1 were converted into $\gamma$-$Fe_2O_3$ as described in Example II.1, except for the use of a batch tubular furnace and a reduction temperature of 360° C. The results are shown in Table 2.

EXAMPLE II.3

A continuous furnace with three heating zones was used to convert 20 kg of $\gamma$-FeOOH from Example I.1 in a nitrogen stream to $Fe_2O_3$ in the course of 30 minutes. These three heating zones were maintained at temperatures of 310°, 400° and 420° C. respectively.

The $Fe_2O_3$ was then mixed with 2.5% by weight, based on $Fe_2O_3$, of stearic acid and was reduced in the same type of furnace at temperatures of 270°, 375° and 380° C. in a gas mixture of 1.25 m³ (S.T.P)/h of hydrogen and 1.75 m³ (S.T.P)/h of nitrogen in the course of 30 minutes to give $Fe_3O_4$.

The oxidation to $\gamma$-$Fe_2O_3$ was carried out in the course of 30 minutes in the same type of furnace in a mixture of 3.25 m³ (S.T.P)/h of air and 0.25 m³ (S.T.P.)/h of nitrogen, all three heating zones being maintained at 280° C. The results are shown in Table 2.

EXAMPLE II.4

180 g of the $\gamma$-FeOOH of Example I.1 were mixed with 2.5% by weight of a high molecular weight polyethylene (molecular weight 250,000) and were reduced in the course of 30 minutes at 450° C. in a nitrogen stream in a batch tubular furnace to $Fe_3O_4$, and were then oxidized at 280° C. with air in a furnace of the same type in the course of 30 minutes to $\gamma$-$Fe_2O_4$. The results are shown in Table 2.

COMPARATIVE EXAMPLE II.5

The $\gamma$-FeOOH prepared in Example I.1 was dehydrated and heated in a batch tubular furnace to $Fe_2O_3$ as described in Example II.2. The $Fe_2O_3$ was then reduced in a furnace of the same type in the course of 30 minutes at 380° C. in a hydrogen gas stream to $Fe_3O_4$. Before entry into the reduction tube, the $H_2$ stream was passed through water at 60° C. The $Fe_3O_4$ was oxidized to $\gamma$-$Fe_2O_3$ in a further furnace of the same type. The results are shown in Table 2.

COMPARATIVE EXAMPLE II.6

The $\gamma$-FeOOH prepared in Example I.1 was directly reduced to $Fe_3O_4$ and oxidized to $\gamma$-$Fe_2O_3$, as described in Example II.5. The results are shown in Table 2.

EXAMPLE II.7

The $\gamma$-FeOOH prepared in Example I.2 was dehydrated and heated in a batch tubular furnace in a nitrogen stream in the course of 30 minutes at 420° C. to give $Fe_2O_3$.

The $Fe_2O_3$ was then mixed with 2.5% by weight, based on $Fe_2O_3$, of stearic acid and reduced in a furnace of the same type in the course of 30 minutes at 380° C. in a gas stream consisting of equal parts of hydrogen and nitrogen to $Fe_3O_4$. Before entry into the reduction tube, the $H_2/N_2$ gas mixture was passed through water at 60° C. On completion of the reduction, the magnetite sample was oxidized in a furnace of the same type in the course of 30 minutes at 280° C. in an air stream to γ-Fe$_2$O$_3$. The results are shown in Table 2.

EXAMPLE II.8

In a continuous tubular furnace, part I.3 A of the γ-FeOOH from Example I.3 was dehydrated in a nitrogen stream. The temperatures of the three heating zones were 250°, 330° and 350° C. respectively, and the residence time of the product was 40 minutes. The α-Fe$_2$O$_3$ was subsequently reduced in a further tubular furnace by means of an N$_2$/H$_2$ mixture and added stearic acid (2.5% by weight, based on α-Fe$_2$O$_3$) to Fe$_3$O$_4$. The temperatures of the three heating zones were 330°, 500° and 440° C. respectively, and the residence time was 40 minutes. Oxidation to γ-Fe$_2$O$_3$ was effected in a third tubular furnace by passing air through at 250° C. The results are shown in Table 2.

EXAMPLE II.9

Part I.3 B of the γ-FeOOH from Example I.3 was reduced with hydrogen to Fe$_3$O$_4$ in a continuous tubular furnace at temperatures in the three heating zones of 300°, 415° and 480° C. respectively. The residence time was 40 minutes. The oxidation to γ-Fe$_2$O$_3$ was effected as described in Example II.8. The results are shown in Table 2.

EXAMPLE II.10

The γ-FeOOH prepared in Example I.4 was converted to γ-Fe$_2$O$_3$ as described in Example II.2, except that the γ-FeOOH was dehydrated at 400° C. The results are shown in Table 2.

COMPARATIVE EXAMPLE II.11

The γ-FeOOH of Example I.5 was converted to γ-Fe$_2$O$_3$ as described in Example II.8, except that the temperatures of the three heating zones in the deyhdration were 250°, 350° and 370° C. respectively. The results are shown in Table 2.

COMPARATIVE EXAMPLE II.12

γ-FeOOH from Example I.6 was dehydrated in a continuous tubular furnace under a nitrogen atmosphere at 380° C., the residence time being 30 minutes. The resulting γ-Fe$_2$O$_3$ was mixed with 2.5% by weight of stearic acid and subsequently reduced at 360° C. in a nitrogen/hydrogen atmosphere to Fe$_3$O$_4$. Oxidation of the Fe$_3$O$_4$ was effected continuously at 280° C. in an air stream. The results are shown in Table 2.

EXAMPLE II.13

200 g of the γ-FeOOH prepared in Example I.7 were dehydrated and heated in a batch tubular furnace in a nitrogen stream in the course of 1 hour at 600° C. to give Fe$_2$O$_3$. The Fe$_2$O$_3$ was subsequently mixed with 2.5% by weight, based on Fe$_2$O$_3$, of stearic acid and reduced in a furnace of the same type in the course of 30 minutes at 430° C. in a gas stream, saturated with water vapor at 60° C. and consisting of equal parts of hydrogen and nitrogen, to Fe$_2$O$_3$. The magnetite sample was then oxidized at 280° C. in the course of 30 minutes in an air stream to γ-Fe$_2$O$_3$. The results are shown in Table 2.

COMPARATIVE EXAMPLE II.14

2.5 kg of α-FeOOH from Example I.8 were converted to γ-Fe$_2$O$_3$ as described in Example II.12, except that the dehydration and reduction temperatures were 650° C. and 400° C. respectively. The results are shown in Table 2.

COMPARATIVE EXAMPLE II.15

2.5 kg of γ-FeOOH from Example I.9 were converted to γ-Fe$_2$O$_3$ as described in II.12, except that the dehydration was carried out at 700° C. in air and the reduction in a mixture consisting of equal parts of nitrogen and hydrogen. The results are shown in Table 2.

EXAMPLE II.16

A γ-FeOOH prepared as described in Example II.4 was converted into γ-Fe$_2$O$_3$ as described in Example II.2, except that the dehydration temperature was 370° C. and the reduction temperature 400° C. The results are shown in Table 2.

EXAMPLE III.1

In a thermostatable glass vessel, 145.35 g of CoCl$_2$.6-H$_2$O were dissolved in 4.8 l of water while introducing nitrogen, and 1.2 kg of Fe$_2$O$_3$ from Example II.1 were suspended therein with vigorous stirring. 15% strength sodium hydroxide solution was then added until a pH of 12.6 had been reached. Further vigorous stirring for one hour was followed by the addition of 420 ml of 30.8% strength FeCl$_2$ solution and continued vigorous stirring for the contents for 6 hours. Throughout the entire procedure, a temperature of about 50° C. was maintained and the entire contents of the vessel were covered by a blanket of nitrogen. Cooling of the suspension with continued nitrogen blanketing was followed by filtration, and washing of the filter cake with water until the filtrate gave a neutral reaction. The filter cake was then dried at 80° C. in vacuo. The product was then aftertreated at 260° C. in a tubular furnace for 10 minutes by passing over a nitrogen stream containing alcohol vapor. The results are shown in Table 2.

EXAMPLE III.2

Example III.1 was repeated, except that the starting material used was the γ-Fe$_2$O$_3$ from Example II.2, and 193.8 g of CoCl$_2$.6 H$_2$O and 750 ml of 30.3% strength FeCl$_2$ solution were used. The aftertreatment was carried out at 135° C. in a nitrogen stream in a tubular furnace for 2 hours. The results are shown in Table 2.

EXAMPLE III.3

Example III.2 was repeated, except that the starting material used was the product from Example II.2 and the aftertreatment was carried out at 160° C. The results are shown in Table 2.

EXAMPLE III.4

Example III.2 was repeated, using as starting material the product from Example II.4 and carrying out the aftertreatment at 180° C. under nitrogen. The results are shown in Table 2.

EXAMPLE III.4 A

Example III.1 was repeated, except that the suspended iron oxide from Example II.4 had added to it, in addition to the cobalt chloride, 3.93 ml of olive oil. The results are shown in Table 2.

COMPARATIVE EXAMPLE III.5

The iron oxide prepared in Example II.5 was modified with 4% by weight of cobalt and 12% by weight divalent iron, as described in Example III.2. The results are shown in Table 2.

COMPARATIVE EXAMPLE III.6

The iron oxide prepared in Example II.6 was treated as described in Comparative Example III.5. The results are shown in Table 2.

EXAMPLE III.7

Example III.2 was repeated using iron oxide from Example II.7. The results are shown in Table 2.

EXAMPLE III.8

The iron oxide prepared in Example II.8 was modified as described in Example III.2. The aftertreatment was carried out at 140° C. The results are shown in Table 2.

EXAMPLE III.9

The iron oxide prepared in Example II.9 was modified as described in Example III.2. The aftertreatment was carried out at 175° C. The results are shown in Table 2.

EXAMPLE III.10

The iron oxide prepared in Example II.10 was modified as described in Example III.2, except that no aftertreatment was carried out. The results are shown in Table 2.

COMPARATIVE EXAMPLE III.11

Example III.10 was repeated, except that the iron oxide from Example II.11 was used. The results are shown in Table 2.

COMPARATIVE EXAMPLE III.12

The iron oxide prepared as described in Example II.12 was converted as described in Example III.10. The results are shown in Table 2.

EXAMPLE III.13

With vigorous stirring and blanketing of the contents of the reaction vessel with nitrogen throughout the reaction, 60 g of the iron oxide obtained as described in Example II.13 were dispersed in 300 ml of water in the presence of 4% by weight of Co in the form of $CoCl_2.6H_2O$, and after 30 minutes the temperature was adjusted to 50° C. 38 ml of 31.3% strength $FeC_2$ solution, corresponding to 12% by weight of Fe(II), based on Co-$\gamma$-$Fe_2O_3$, were then added, followed 10 minutes later by 50 ml of 50% strength aqueous sodium hydroxide solution. Six hours of stirring at 50° C. was followed by cooling to 22° C., filtration, washing with water, drying of the filter cake at 80° C. in a vacuum drying cabinet and subsequent aftertreatment thereof at 180° C. in a stream of nitrogen for 2 hours. The results are shown in Table 2.

COMPARATIVE EXAMPLE III.14

The iron oxide prepared as described in Example II.14 was treated as described in Example III.10. The results are shown in Table 2.

COMPARATIVE EXAMPLE III.15

The iron oxide prepared as described in Example II.15 was modified as described in Example III.2, and was aftertreated at 180° C. under nitrogen. The results are shown in Table 2.

EXAMPLE III.16

In a thermostatable glass vessel, 4.03 g of $CoCl_2.6H_2O$ were dissolved in 500 ml of water, 100 g of $\gamma$-$Fe_2O_3$ from Example II.16 were suspended therein with vigorous stirring, and the temperature was raised to 90° C. in the course of 30 minutes. 7 ml of 50% strength NaOH were then added dropwise, and the suspension was stirred at 90° C. for a further 4 hours. After cooling, the suspension was filtered and the filter cake washed with water until the filtrate gave a neutral reaction. After drying at 100° C. in air, the product was heated at 220° C. under nitrogen for 2 hours. The results are shown in Table 2.

COMPARATIVE EXAMPLE III.17

An iron oxide prepared as described in Example II.11 was modified as described in Example III.16. The results are shown in Table 2.

EXAMPLES IV.1 to 15

In each case, 640 parts of a 12.5% strength solution of a thermoplastic polyester urethane, prepared from adipic acid, butane-1,4-diol and 4,4'-diisocyanatodiphenylmethane, in a mixture of equal parts of tetrahydrofuran and dioxane and 100 parts of a 20% strength solution of a phenoxy resin of bis-phenol A and epichlorohydrin in the same solvent mixture were dispersed with 810 parts of cobalt-modified $\gamma$-iron(III) oxide from Examples III.1 to III.15, 2.25 parts of sodium oleate, 27 parts of aluminum oxide, 90 parts of a chrome dioxide having a coercive force of 50 kA/m, 14 parts of a vinylpyrrolidone/vinyl acetate copolymer having a molecular weight of 10,000 and a further 600 parts of the said solvent mixture in a ball mill which had a capacity of 6000 parts by volume and contained 8000 parts of steel balls from 4 to 6 mm in diameter, for 4 days. A further 640 parts of the said polyester urethane solution and 100 parts of the phenoxy resin solution were then added together with 18 parts of butyl stearate, 4.5 parts of stearic acid and 400 parts of the said solvent mixture, and dispersion was carried out for a further 24 hours. The resulting dispersion was filtered under pressure through a filter having 5 $\mu$m pores and was applied to a 14.5 $\mu$m thick polyethylene terephthalate film by means of a conventional knife coater. The coated film was passed through a magnetic field to orient the magnetic particles and was then dried at 60°-80° C. After drying, the magnetic layer was calendered by passing the coated film twice between heated rolls. The thickness of the magnetic layer was then 4 $\mu$m. The coated films were slit into ½ inch wide video tapes which were tested on a commercially available VHS video recorder from the Victor Company of Japan (JVC) to determine their luminance signal to noise (S/N) ratios. The results are shown in Table 2.

EXAMPLE V.1

A ball mill having a capacity of 250 parts by volume and containing 100 parts of steel balls was charged with 50 parts of magnetic iron oxide from Example III.16, 3 parts of a long-chain amphoteric, organophilic dispersant, 0.05 part of a silicone oil and 0.5 part of an isomeric carboxylic acid mixture having a flow point <5° C., 6.6 parts of a commercially available isocyanate-free polyester urethane prepared from adipic acid, butane-1,4-diol and 4,4'-dicyanato-diphenylmethane and having a K value of 61 (measured as a 1% strength solution in tetrahydrofuran) and 25 parts of a vinyl chloride/ethyl maleate copolymer having a K value of 59 (likewise measured as a 1% strength solution in tetrahydrofuran), and also with 78 parts of a mixture of equal parts of tetrahydrofuran and 1,4-dioxane, the said binders being added in the form of their solutions in the said solvent mixture. After a dispersing time of 2.5 hours, the magnetic dispersion was filtered and subsequently applied by means of a conventional coating apparatus to a 12 μm thick polyethylene terephthalate film. This was followed by drying in a tunnel dryer and calendering on a heated multiroll calender. The resulting coated film was slit into 3.81 mm wide tapes, and the reference level-to-weighted noise ratio ($RG_A$) and the signal to print-through ratio ($K_o$) were determined in accordance with DIN 45,512, Sheet 2, against the IEC I reference tape.

$RG_A = +0.6$ dB
$K_o = +0.6$ dB

EXAMPLE V.2

Example V.1 was repeated, except that the magnetic material used was that obtained in Example III.17. The results obtained were as follows:

$RG_A = -0.3$ dB
$K_o = +3.5$ dB of phosphate ions by adding alkalis to an acidic iron (II) salt solution and simultaneously carrying out oxidation by passing in air, from 25 to 60 mol % of the iron (II) ions present being converted into γ-FeOOH nuclei, and then, in a second stage, growing the said nuclei at 20° to 70° C. by keeping the pH value at 4.0 to 5.5 by the addition of further amounts of alkali and further passing of air through the suspension, to form γ-FeOOH end product, filtering and washing said end product, dehydrating the washed end product at 300°-600° C. and then reducing the dehydrated end product to magnetite by means of organic substances which are decomposable in the presence of iron oxide, subsequently oxidizing said magnetite with oxygen-containing gases to gamma-iron (III) oxide, and then modifying said gamma-iron (III) oxide by precipitating iron (II) hydroxide and cobalt (II) hydroxide onto said gamma-iron (III) oxide in an alkaline suspension at a pH of not less than 10 and filtering the modified gamma-iron (III) oxide and heating it at 100°-350° C. under inert gas.

2. The process of claim 1, wherein the heating of the gamma-iron (III) oxide containing precipitated iron (II) hydroxide and cobalt (II) hydroxide is carried out in an atmosphere composed of an inert gas and an organic compound which is decomposable at 100°-350° C. in the presence of iron oxide.

TABLE 2

| | γ-Fe$_2$O$_3$ | | | | | Co-doped γ-Fe$_2$O$_3$ | | | | Video tapes luminance S/N |
|---|---|---|---|---|---|---|---|---|---|---|
| Example | $S_{N2}$ [m$^2$/g] | $H_c$ [kA/m] | $M_r/\rho$ [nTm$^3$/g] | $M_m/\rho$ | Example | $S_{N2}$ [m$^2$/g] | $H_c$ [kA/m] | $M_r/\rho$ [nTm$^3$/g] | $M_m/\rho$ | ratio [dB] |
| II.1 | 22.8 | 21.9 | 38 | 81 | III.1 | 22.0 | 49.5 | 50 | 83 | 2.0 |
| II.2 | 22.3 | 20.2 | 38 | 80 | III.2 | 22.6 | 46.1 | 46 | 81 | 1.4 |
| II.3 | 25.8 | 21.7 | 40 | 83 | III.3 | 22.1 | 49.3 | 45 | 79 | 2.6 |
| II.4 | 26.3 | 23.4 | 39 | 81 | III.4 | 22.2 | 49.1 | 45 | 78 | 2.4 |
| | | | | | III.4 A | 23.8 | 49.5 | 45 | 77 | 2.4 |
| II.5 (V) | 16.0 | 22.2 | 40 | 85 | III.5 (V) | 16.5 | 49.6 | 50 | 84 | −2.0 |
| II.6 (V) | 18.0 | 23.1 | 41 | 85 | III.6 (V) | 18.0 | 48.0 | 49 | 83 | −2.0 |
| II.7 | 22.3 | 17.9 | 40 | 86 | III.7 | 20.2 | 48.0 | 46 | 78 | 2.4 |
| II.8 | 24.9 | 22.3 | 40 | 81 | III.8 | 17.2 | 49.2 | 46 | 85 | 0.8 |
| II.9 | 22.9 | 24.5 | 39 | 77 | III.9 | 18.6 | 48.8 | 45 | 78 | 2.0 |
| II.10 | 21.4 | 25.9 | 44 | 83 | III.10 | 18.7 | 51.5 | 46 | 81 | 1.2 |
| II.11 (V) | 21.0 | 27.6 | 42 | 85 | III.11 (V) | 15.1 | 51.5 | 46 | 82 | 0.2 |
| II.12 (V) | 21.9 | 24.6 | 37 | 81 | III.12 (V) | 20.0 | 48.5 | 48 | 86 | −0.8 |
| II.13 | 27.0 | 24.2 | 43 | 82 | III.13 | 23.6 | 57.3 | 57 | 84 | — |
| II.14 (V) | 28.6 | 27.8 | 43 | 81 | III.14 (V) | 25.9 | 48.2 | 49 | 86 | 0 |
| II.15 (V) | 24.3 | 26.4 | 42 | 81 | III.15 (V) | 19.1 | 56.3 | 49 | 82 | +0.6 |
| 11.16 | 20.8 | 26.4 | 40 | 77 | III.16 | 19.8 | 30.9 | 42 | 81 | — |
| | | | | | III.17 (V) | 20.4 | 34.3 | 41 | 79 | — |

We claim:

1. A process for preparing acicular cobalt-containing ferrimagnetic iron oxide exhibiting high luminance signal-to-noise ratio in a magnetic recording medium comprising producing, in a first stage, a suspension of γ-FeOOH nuclei in the presence of from 0.2 to 1.0% by weight, based on the amount of γ-FeOOH end product, 3. A process as claimed in claim 1, wherein an organic substance which is decomposable at 100°-350° C. in the presence of iron oxides is present in the suspension in the course of the precipitation of iron (II) hydroxide and cobalt (II) hydroxide onto the gamma-iron (III) oxide.

* * * * *